United States Patent [19]

Sakakibara

[11] Patent Number: 5,153,638

[45] Date of Patent: Oct. 6, 1992

[54] IMAGE PROJECTION APPARATUS AND THE METHOD OF DRIVING THE ZOOM LENS

[75] Inventor: Katsunori Sakakibara, Fujisawa, Japan

[73] Assignee: Minolta Camera Co., Ltd., Osaka, Japan

[21] Appl. No.: 629,583

[22] Filed: Dec. 18, 1990

[30] Foreign Application Priority Data

Dec. 26, 1989 [JP] Japan ................................ 1-334986

[51] Int. Cl.⁵ .............................................. G02B 7/00
[52] U.S. Cl. ........................................ 355/55; 355/45; 355/243; 355/271
[58] Field of Search ............... 355/243, 55, 56, 208, 355/209, 271, 45; 353/100, 101

[56] References Cited

U.S. PATENT DOCUMENTS

| | | | |
|---|---|---|---|
| 4,412,737 | 11/1983 | Iwanade et al. | 355/55 |
| 4,521,100 | 6/1985 | Yonemori et al. | 355/243 |
| 4,806,988 | 2/1989 | Verner | 355/55 |
| 4,942,425 | 7/1990 | Kamimura et al. | 355/55 X |
| 5,036,352 | 7/1991 | Kamimura et al. | 355/55 X |

FOREIGN PATENT DOCUMENTS 63118733 5/1985 Japan .

*Primary Examiner*—Richard L. Moses
*Assistant Examiner*—Robert Beatty
*Attorney, Agent, or Firm*—Price, Gess & Ubell

[57] ABSTRACT

An image projection apparatus which projects an image of a microfilm onto a screen and copies the image. Among a plurality of projection lenses, which are zoom lenses having set-ups of magnifications in correspondence to the sizes of text images and copy paper, a lens with a set-up of the intended magnification is mounted selectively on the apparatus for the operation. When the lens is mounted, it is initialized to a reference magnification regardless of the magnification which has been set, and in this operation the zoom value is memorized. Subsequently, the lens is zoomed by the memorized zoom value in the opposite direction so that the magnification which has been set previously is restored.

17 Claims, 11 Drawing Sheets

IMAGE PROJECTION APPARATUS AND THE METHOD OF DRIVING THE ZOOM LENS

BACKGROUND OF THE INVENTION

1. Field of the Invention

The present invention relates to an image projection apparatus, and particularly to an image projection apparatus which uses a zoom lens for projecting an image onto an image receiving plane and further relates to a method of driving a zoom lens of an image projection apparatus.

2. Description of the Prior Art

A microfilm reader-printer which projects a magnified image on a screen and copies the magnified image on a copy paper uses a zoom lens for altering magnifications of projection according to the size of original image on a microfilm and the size of the copy paper. Such a microfilm reader-printer using a zoom lens often needs to recognize the magnification of the zoom lens in order to indicate the magnification on a display numerically or alter the magnification to a specified value. To meet this requirement, the conventional microfilm reader-printer is designed such that when the zoom lens is attached to the microfilm reader-printer, an initializing operation takes place to set the magnification of the zoom lens to a reference value regardless of the current magnification of the zoom lens.

On the other hand, when the microfilm reader-printer is used in a copy operation, only a few kinds of magnifications are required in general because of the standardized dimensions of the frame of the microfilm and the copy paper. For example, in many cases, the first copy operation uses magnification A, the second copy operation uses magnification B, and the third copy operation uses the magnification A again.

It is a tedious task to set the magnification of the zoom lens to another value each time the projection condition varies, and therefore a conceivable maneuver is to prepare several zoom lenses, with magnifications for intended projection conditions being set in advance, and to select a lens which meets the projection condition. However, for the above-mentioned microfilm reader-printer in which the reference magnification is set automatically when the zoom lens is mounted, it is not possible to preset the intended magnification, and the operator is obliged unfavorably to reset the intended magnification at each operation.

SUMMARY OF THE INVENTION

A prime object of the present invention is to provide an improved image projection apparatus using projection lenses of variable magnification type, wherein the apparatus can operate for image projection with a replaced projection lens at the magnification which is preset on the lens.

Another object of the present invention is to provide a method of driving a zoom lens for an image projection apparatus using projection lenses of variable magnification type, wherein the method implements automatic zooming for a replaced projection lens so that image projection takes place at the magnification which is preset on the lens.

Other objects of the present invention will become apparent from the following detailed description taken in conjunction with the accompanying drawings.

DETAILED DESCRIPTION OF THE PREFERRED EMBODIMENT

Figure 1:
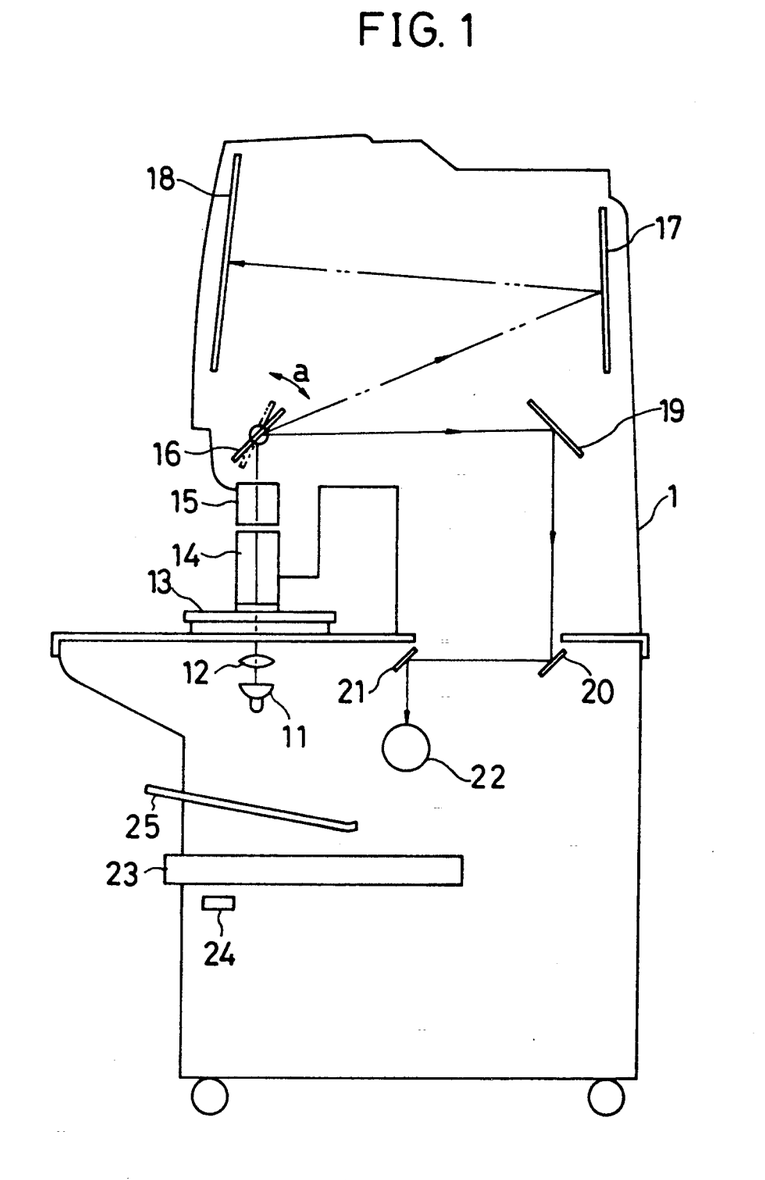
FIG. 1 is a side cross-sectional diagram of the microfilm reader-printer which embodies the present invention.
Figure 2:
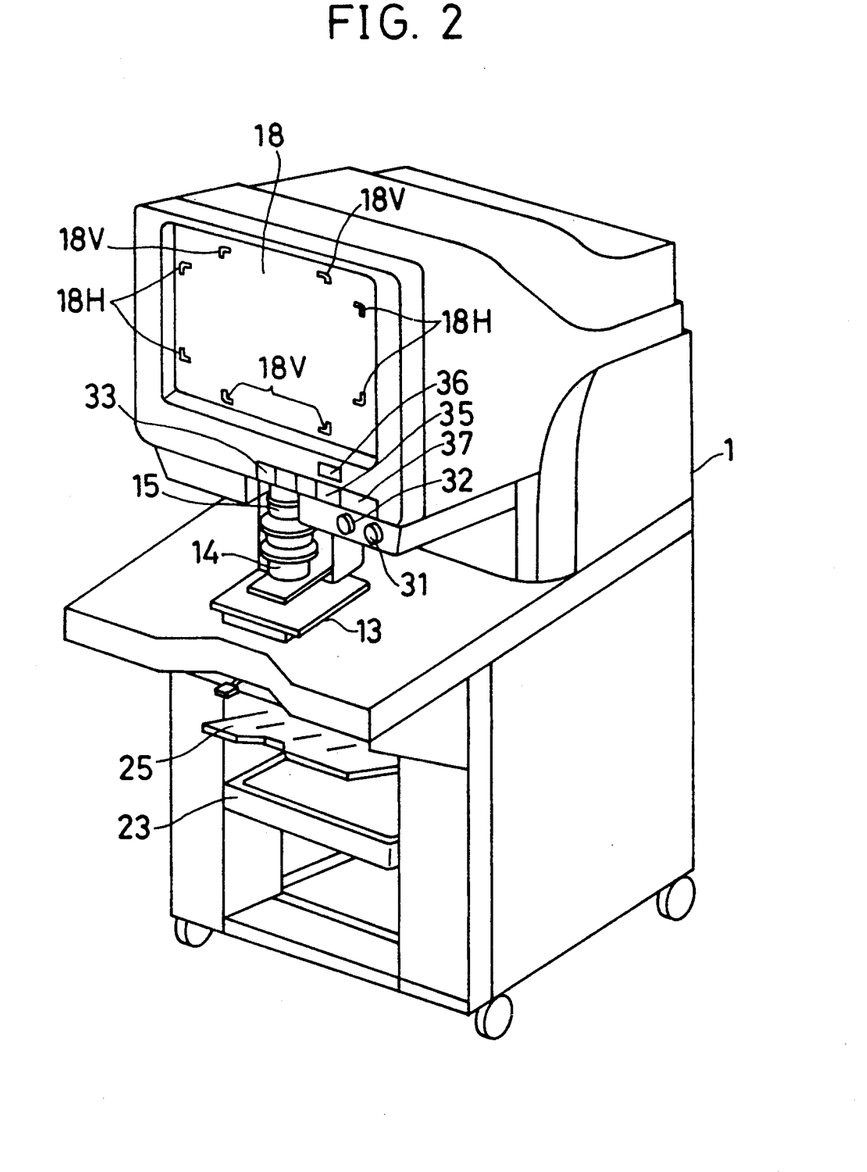
FIG. 2 is a perspective diagram of the microfilm reader-printer viewed from the top front corner.

An embodiment of the present invention will be described. FIG. 1 is a side cross-sectional view of a microfilm reader-printer according to the present invention, and FIG. 2 is a perspective view of the microfilm reader-printer seen from the top front corner. In FIGS. 1 and 2, indicated by 1 is the main unit of the microfilm reader-printer, 11 is a light source, 12 is a condenser lens, 13 is a microfilm carrier, 14 is a projection lens equipped with an automatic zooming mechanism which will be explained later, 15 is an image rotation prism, and 16 is a scanning mirror which switches the light path for the reader system or printer system and also functions to scan the image on the microfilm at printing. 17 is a reflection mirror on the light path the reader system, and 18 is a screen which has marks 18V indicative of the corner positions of a projected image having a vertically elongated profile and marks 18H indicative of the corner positions of a projected image having a horizontally elongated profile. Both images defined by the corner marks 18V and 18H have the same dimensions of the long and short sides.

Indicated by 19, 20 and 21 are reflection mirrors on the light path the printer system, 22 is a photosensitive drum, 23 is a paper supply cassette, 24 is a sensor for detecting the size of copy paper accommodated in the paper supply cassette, and 25 is a paper discharge tray. Although the illustrated microfilm reader-printer is equipped with the image forming facility based on the scheme of electrophotography, it is known in the art and therefore is not depicted in the figure.

Figure 3:
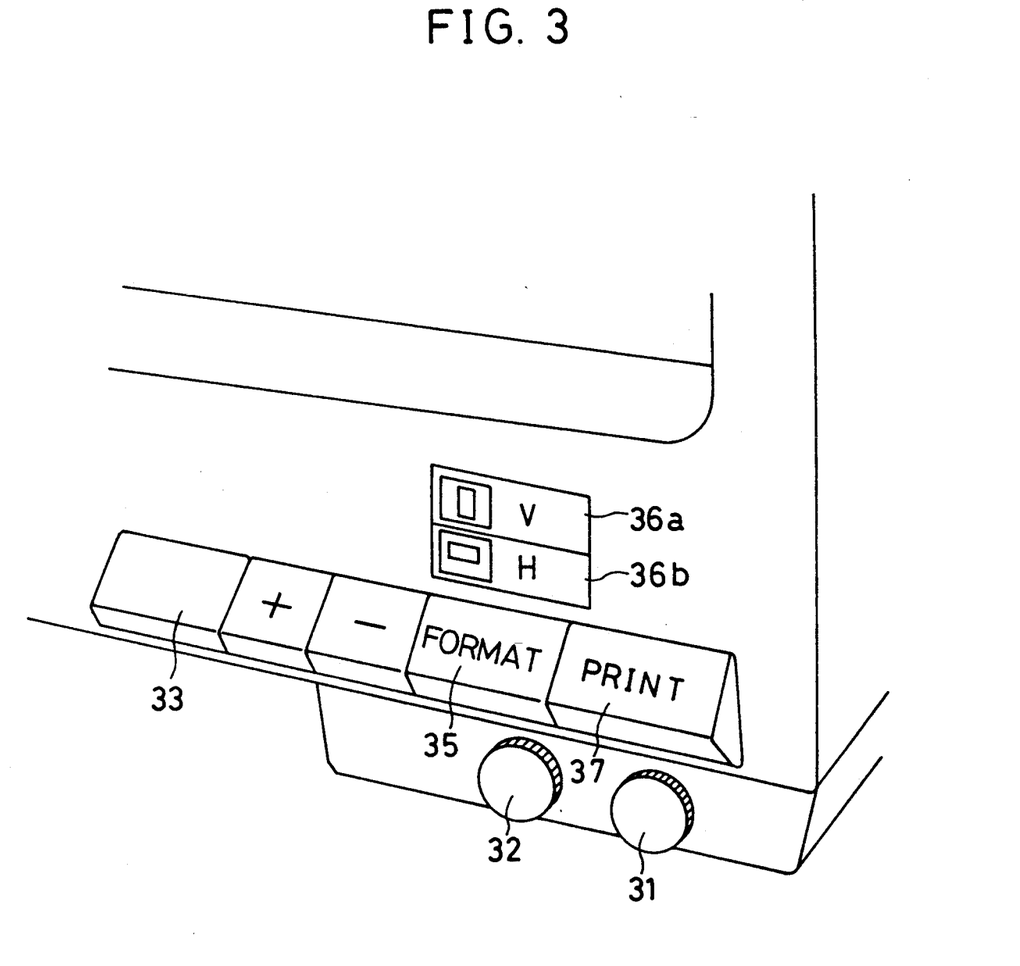
FIG. 3 is an enlarged perspective diagram showing in part the operation panel of the microfilm reader-printer.

FIG. 3 is an enlarged perspective view of the operation panel of the microfilm reader-printer. In the figure, indicated by 31 is a zoom dial used for the manual adjustment of magnification (zoom ratio) of the projection lens 14, 32 is a prism switch used for the manual rotation of the image rotation prism 15, and 33 is an auto zoom set/cancel key used for copying the image, which is projected on the screen, in a zoomed size or a magnified size. 35 is a format selection switch used to enter information as to whether the image is vertically elongated or horizontally elongated. The entered information is indicated on a format display LED 36a or 36b. 37 is a print key, and when it is turned on, the operational mode is switched from reader mode to print mode, and the print operation is started.

Next, the operation of the microfilm reader-printer arranged as described above will be explained in brief.

When power supply switch is turned on, reader mode is selected and the scanning mirror 16 is switched to take the light path of reader system. The light produced by the light source 11 is converged by the condenser lens 12 and projected on the microfilm which is placed on the microfilm carrier 13. The image on the film is conducted through the projection lens 14, image rotation prism 15, scanning mirror 16 and mirror 17, and projected by being magnified on the screen 18.

For printing the image, the magnification of the projection lens 14 is adjusted so that the corners of the image are coincident with the corner marks 18V or 18H on the screen. The format selection switch 35 is operated to set as to whether the image projected on the screen is vertically elongated or horizontally elongated, and it is indicated on the format indicating LED 36a or 36b. Depending on this set-up information, activation or inactivation of image rotation is determined to meet the orientation of copy paper. With the print key 37 being depressed to select print mode, the scanning mirror 16 is operated to take the light path of printer system. The microfilm image irradiated by the light source 11 is conducted through the projection lens 14, image rotation prism 15, scanning mirror 16, reflection mirrors 19, 20 and 21, and projected on the photosensitive drum 22, on which a latent image is formed. The latent image is developed by toner and transferred to the copy paper as a visual image through the usual image processing based on the well-known scheme of electrophotography.

With the format selection switch 35 being set to specify that the image rotation is inactivated, the image rotation prism 15 does not rotate. In addition, the magnification of the projection lens 14 immediately before the print key 37 has been pressed is reset to the magnification at printing automatically. With image rotation being specified, the operation of turning the image rotation prism 15 automatically is added, and the remaining operation is identical to the former case.

Figure 4:
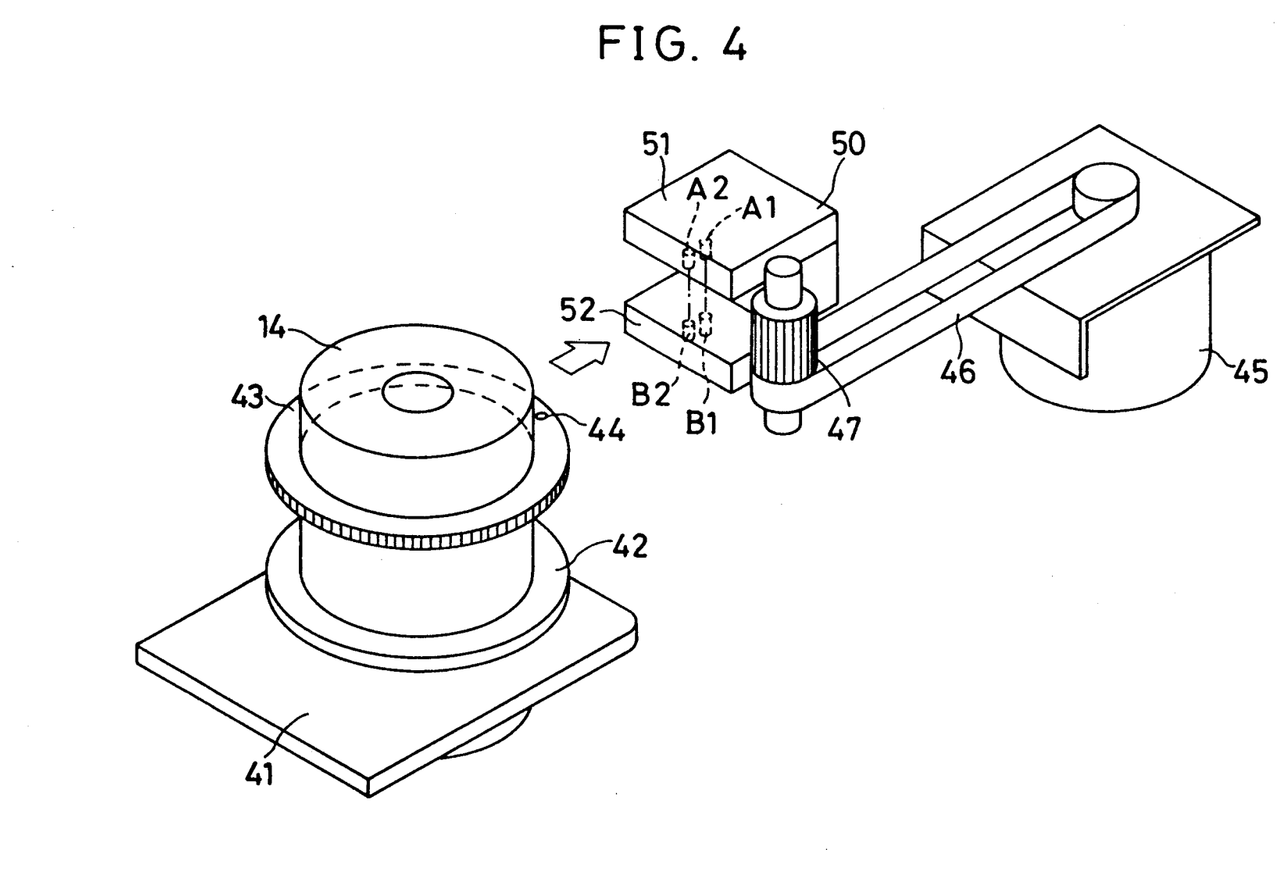
FIG. 4 is a perspective diagram showing the arrangement of the projection lens.

Next, the arrangement of the lens unit which includes the projection lens 14 will be explained with reference to FIG. 4. The microfilm reader-printer 1 is provided with a lens holder (not shown). The projection lens is mounted on a stage 41 which is inserted detachably in the lens holder. The projection lens 14 is a zoom lens which is operative with the auto-zoom function, and is provided with a focus ring 42 used for the manual focus adjustment and a zoom gear 43 used for setting the focal distance (zoom ratio), with a hole 44 for reference magnification position detection being formed in the zoom gear 43. The lens holder is provided with a pinion 47, which is driven by a pulse motor 45 through a belt 46, and it engages with the zoom gear 43.

Disposed above and below the zoom gear 43 is a sensor unit 50 for detecting the reference magnification position detection hole 44. The sensor unit 50 consists of a light transmitter 51 made up of two light emitting elements $A_1$ and $A_2$ and a light receiver 52 made up of two light receiving elements $B_1$ and $B_2$. The reason for the provision of two sets of light emitting elements and light receiving elements is to identify two kinds of projection lenses. Setting of the reference magnification for the first lens is sensed when the detection hole 44 of the zoom gear 43 is located between the light emitting element $A_1$ and light receiving element $B_1$, and the light emitted by the light emitting element $A_1$ has passed the detection hole 44 and is detected by the light receiving element $B_1$ to produce a detection signal. Setting of the reference magnification for the second lens is sensed when the light emitted by the light emitting element $A_2$ has passed the detection hole 44 and is detected by the light receiving element $B_2$ to produce a detection signal. Needless to say, the position of the detection hole 44 formed in the zoom gear 43 of the first lens and that of the second lens are different and are designed to confront the respective light emitting elements and light receiving elements.

If the detection signals are produced by both of the light receiving elements $B_1$ and $B_2$, it is judged that no projection lens 14 is yet mounted, or if no detection signal is produced by any of the light receiving elements $B_1$ and $B_2$, it is judged that the projection lens 14 is mounted, but the reference magnification is not set. Another method of sensing the mount of the projection lens may be based on the detection of the opening or closing of a door provided at the lens stage.

Although in this embodiment the sensor unit consisting of two pairs of light emitting elements and light receiving elements used for the setting of the reference magnification is used in identifying the type of projection lens, an independent sensor unit for identifying the type of projection lens may be provided. For example, notches are formed in the lens holder 41 in correspondence to the types of lens, so that the type of projection lens is identified by the position or depth of the notches.

In the foregoing arrangement, once the projection lens 14 with a set-up of an arbitrary magnification is mounted on the microfilm reader printer 1, the projection lens 14 is driven to rotate by the pulse motor until the sensor unit 50 detects the reference magnification position detection hole 44. During the rotation, the number of pulses fed to the pulse motor is counted by a counter, which will be explained later, and stored as a zooming value that represents a displacement of the zoom lens from an initial magnification value to the reference magnification position. The memory stores a magnification calculation table which indicates the relationship between the number of pulses and the magnification. Based on the magnification calculation table and stored data of the number of pulses, the magnification of the mounted lens can be recognized. After the reference magnification has been set, it is possible to restore the initial magnification of the lens by turning the lens reversely for the amount which meets the number of pulses stored in the memory. Control for these operations will be explained in detail later.

The reason for the detachable arrangement of the projection lens 14 is to cover the large range of focal distance, i.e., zoom ratio, of the reader-printer with multiple lenses, and to meet the requirement of copy operation at different magnifications promptly through the replacement of lenses.

Figure 5:
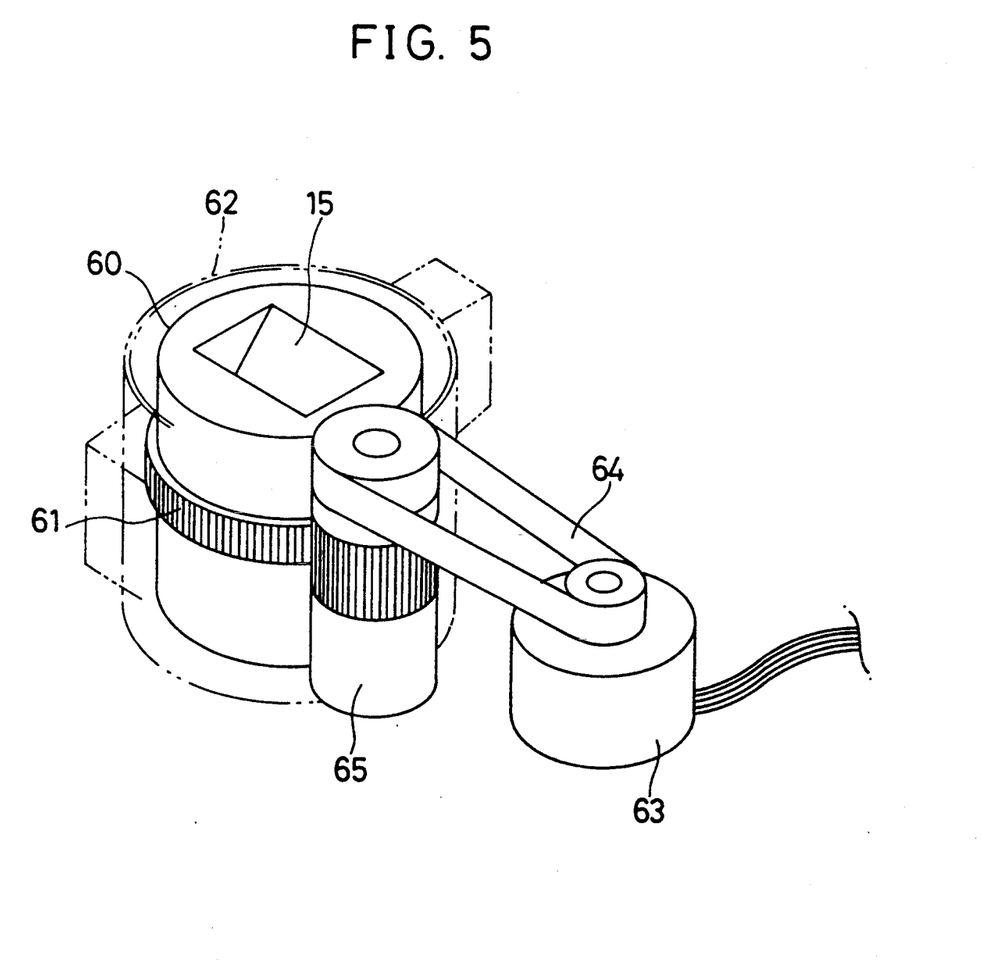
FIG. 5 is a perspective diagram showing the arrangement of the image rotation prism.

Next, the arrangement of the image rotation prism 15 will be explained with reference to FIG. 5. The function of the image rotation prism as an optical device is known in the art and the explanation thereof is omitted, and only the arrangement for rotating the prism will be explained. In the figure, the prism 15 is fitted to a cylindrical member 60 which has a gear section 61 on the exterior wall and is supported rotatably inside an external cylinder 62. The external cylinder 62 has its portion cut away at the position confronting the gear section 61 so that the gear section 61 engages with a pinion 65 which is driven by the pulse motor 63 through the belt 64.

In the foregoing arrangement, when the intended number of pulses are supplied to the pulse motor 63, the image rotation prism 15 is rotated by the angle corresponding to the number of pulses, and consequently the microfilm image is turned by an intended angle, e.g., 90°.

Figure 6:
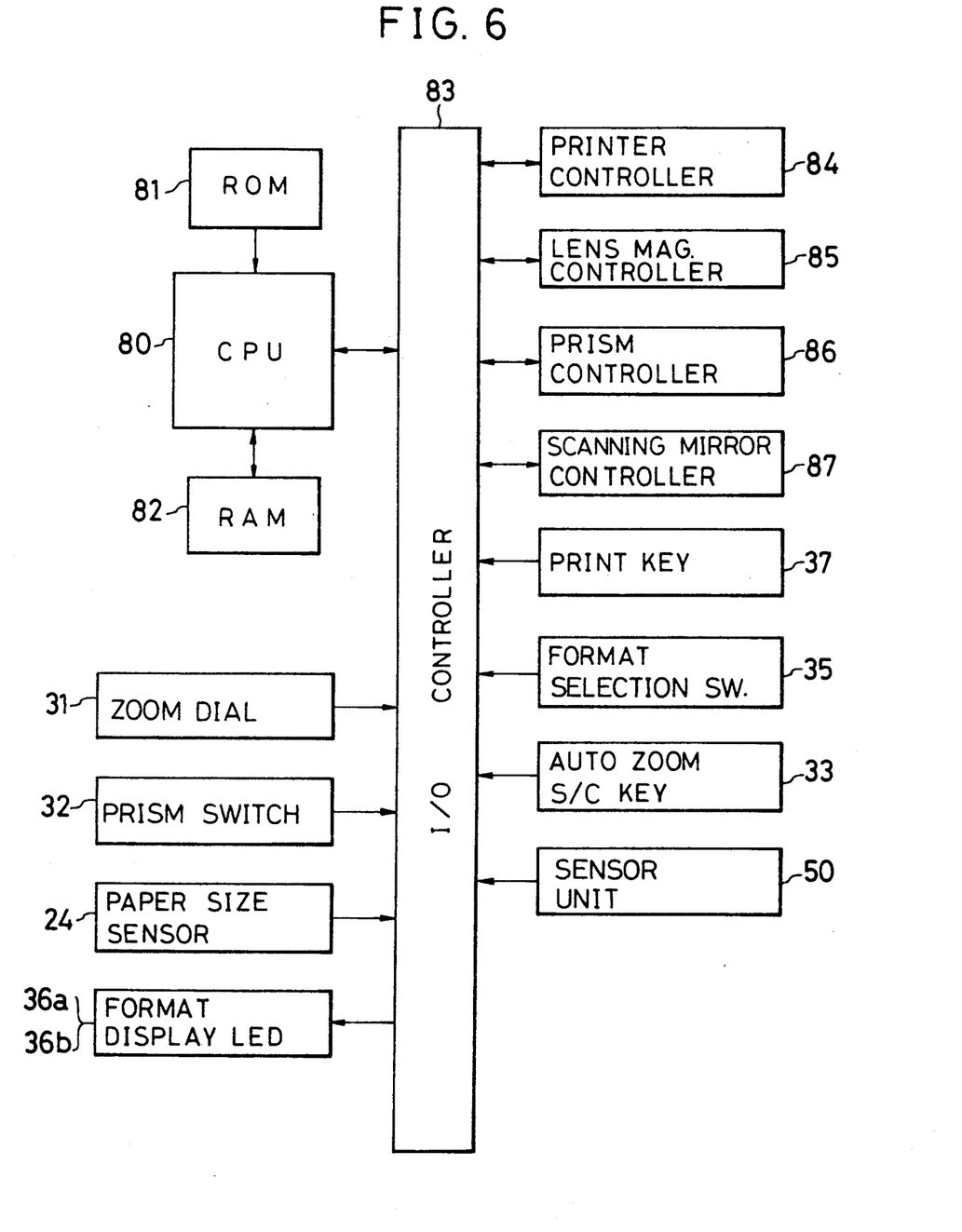
FIG. 6 is a block diagram of the control circuit of the microfilm reader-printer.

FIG. 6 is a block diagram of the control circuit in the microfilm reader-printer. The circuit includes a CPU 80 and a ROM 81 and a RAM 82 in connection with the CPU 80. Further connected to the CPU 80 through an I/O controller 83 are a printer controller 84, a lens magnification controller 85, an image rotation prism controller 86, a scanning mirror controller 87, the print key 37, the format selection switch 35, the auto zoom set/cancel key 33, the sensor unit 50 for detecting the projection lens reference magnification, the zoom dial 31, the prism switch 32, the copy paper size sensor 24, and the format display LED 36a and 36b. The CPU 80 incorporates a counter which adds or subtracts the number of pulses supplied to the pulse motor 45 during the drive of the lens.

The printer controller 84 includes a construction of image processing based on electrophotography in which a latent image of the microfilm image formed on the photosensitive drum 22 is transferred to the copy paper using toner. The lens magnification controller 85 drive mechanism operates in response to a signal entered through the zoom dial 31 on the operation panel and data of magnification calculated by the CPU 80. This data is used to rotate the zoom gear 43 by driving the pulse motor 45 thereby to adjust the projection lens 14 to have the intended magnification. The image rotation prism controller 86 operates in response to the signal entered through the prism switch 32, the signal entered through the format selection switch 35 and the signal indicative of the determination of the activation or inactivation of image rotation made by the CPU 80 in connection with the vertical/horizontal attitude of the image and the orientation of the copy paper, thereby driving the pulse motor 63 to rotate the gear section 61 of the prism cylindrical member 60 so that the image rotation prism 15 is rotated by the intended angle or its initial position is restored.

The scanning mirror controller 87 implements the mirror drive control which includes switching of the light path of the scanning mirror 16 for the reader system or printer system, and scanning of the image in the print operation.

Figure 7A:
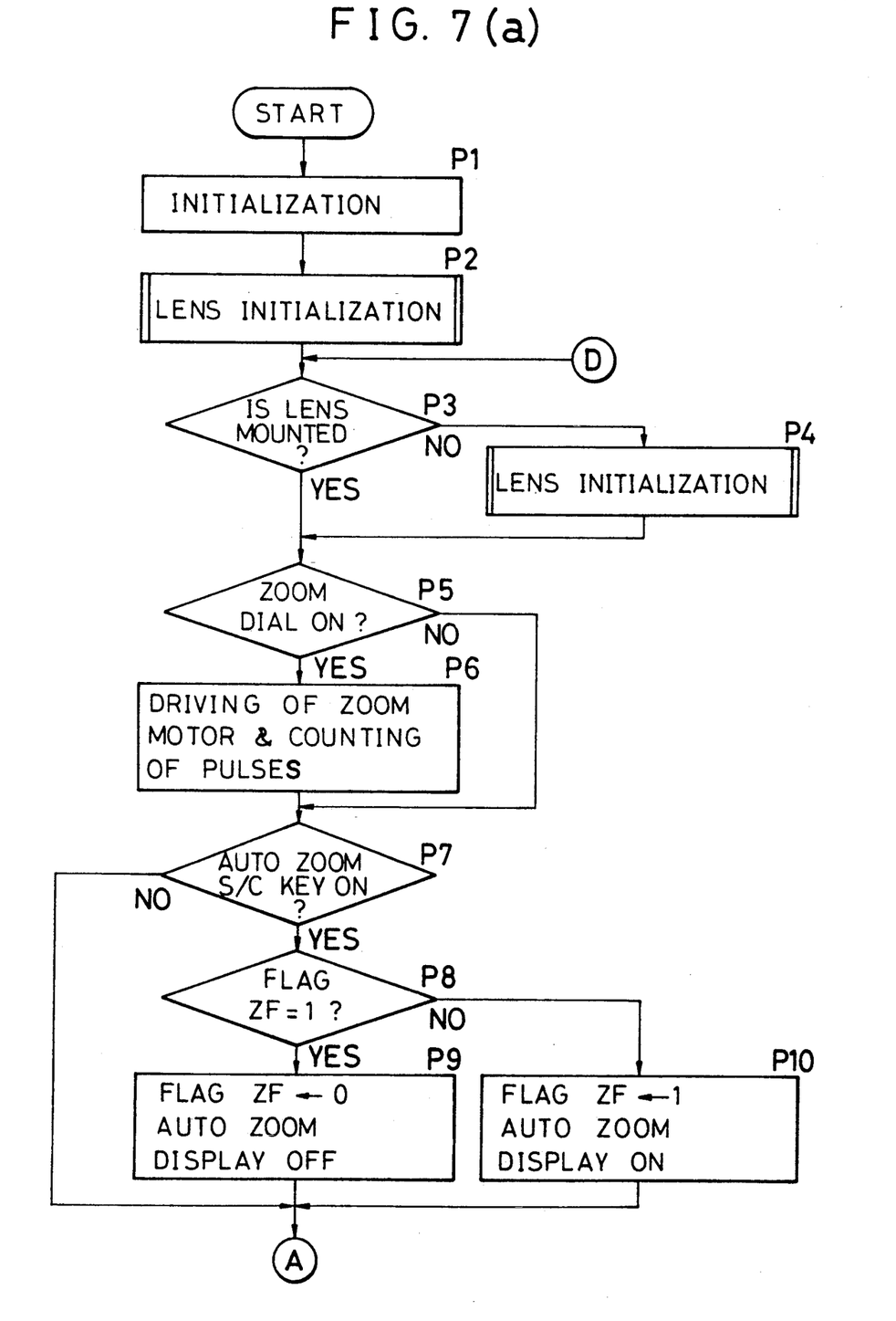
FIGS. 7(a), 7(b) and 7(c) and FIG. 8(a) and 8(b) are flowcharts used to explain the control operation of the control circuit.
Figure 7B:
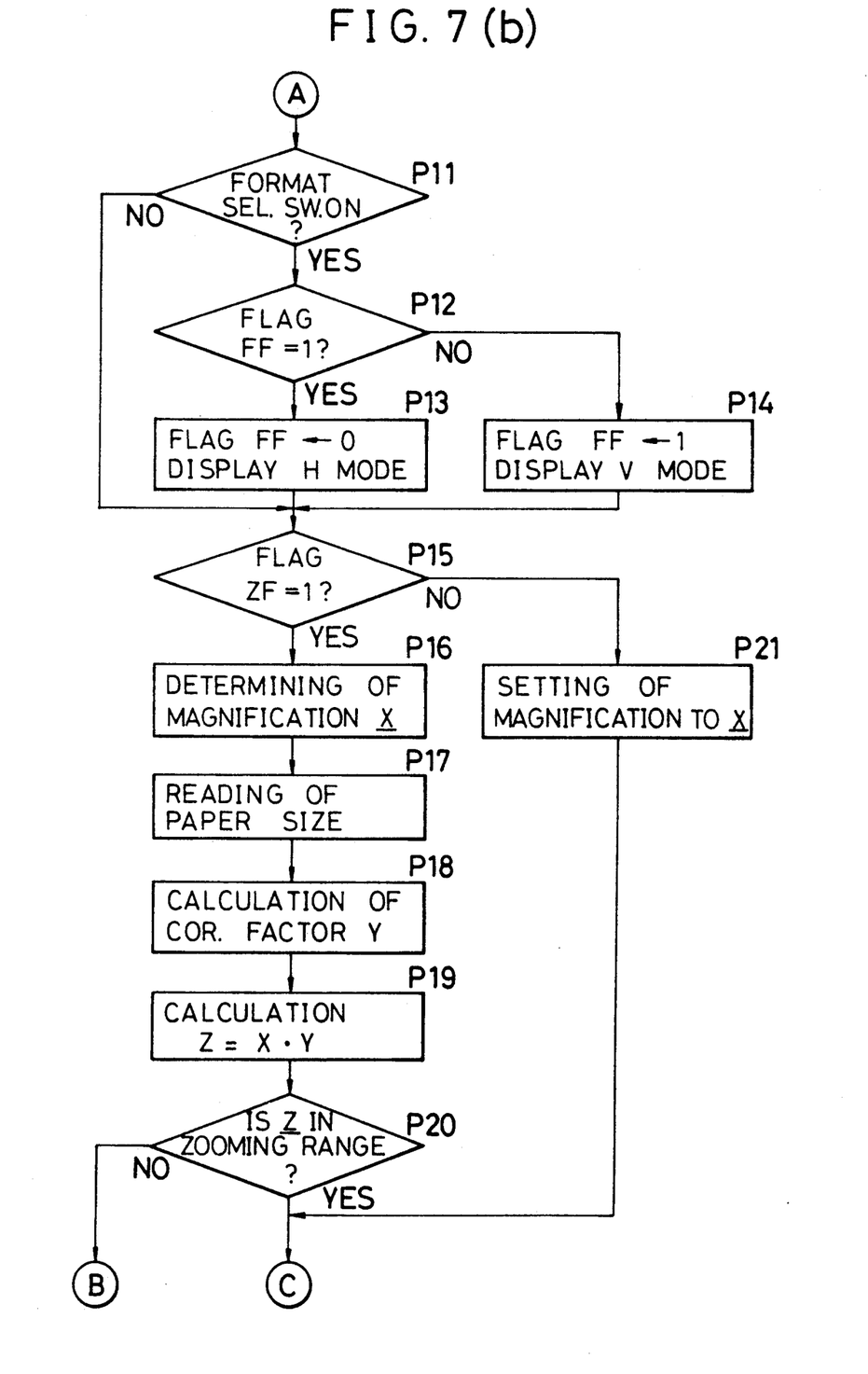
Figure 7C:
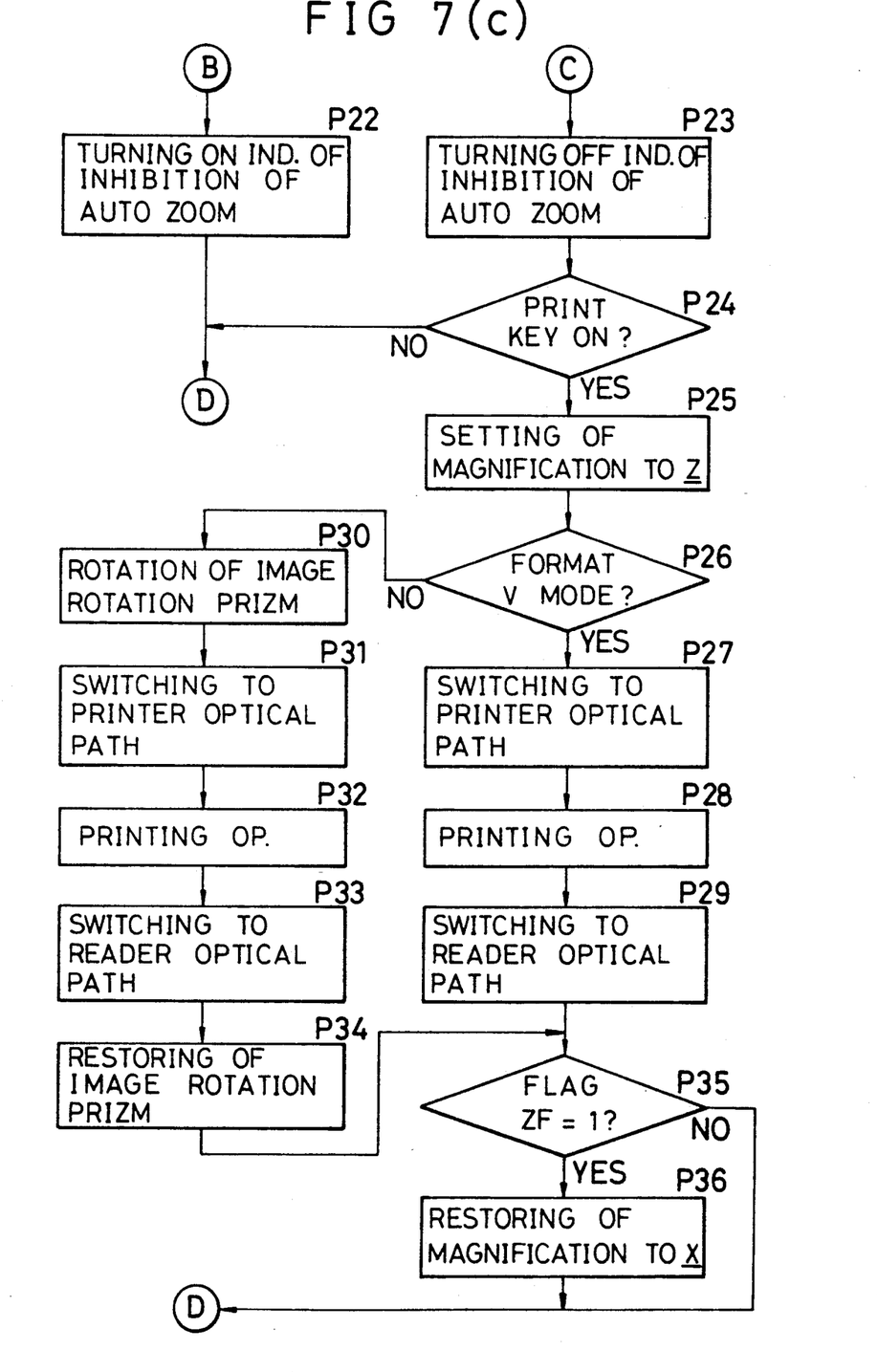
Figure 8:
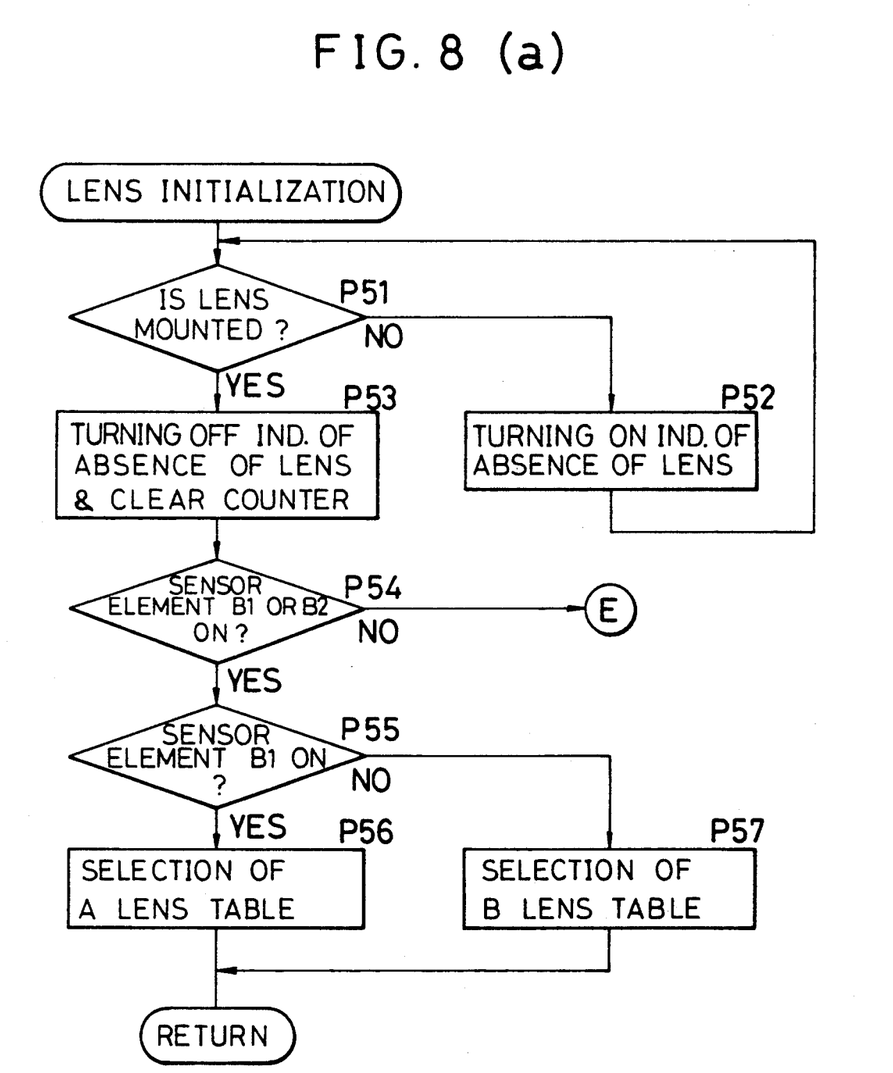

Next, the automatic magnification setting control implemented by the CPU 80 will be explained on the flowcharts of FIGS. 7 and 8.

When the power supply switch is turned on, the print mode is initialized to the vertical mode for a vertically elongated copy paper, which is indicated on the LED 36a, and the auto zoom mode is set for projection lens for initialization, which is indicated on the LED (step P1). The magnification of the projection lens is set to the prescribed reference value once and restored to an initial magnification value for initialization (step P2). It is tested whether or not a projection lens is mounted (step P3). If no projection lens has yet been mounted, the initial setting process for the projection lens takes place (step P4), or otherwise the control sequence proceeds to step P5. In step P5, it is tested whether or not a zooming operation has been carried out on the zoom dial 31 of the operation panel. If the implementation of operation is detected, the zoom motor is driven for the prescribed number of pulses in compliance with the direction of operation of the zoom dial 31, and at the same time the prescribed number of pulses is added or subtracted by the counter (step P6). Subsequently, it is tested whether or not the auto zoom set/cancel key 33 on the operation panel has been turned on (step P7). If the key is found ON, it is tested whether or not an auto zoom flag ZF is 1 (step P8). If ZF is 1, it is reset to 0 and the auto zoom indicator is turned off, or if zoom flag ZF is 0, it is set to 1 and the auto zoom indicator is turned on (steps P9 and P10). The above operation is to set or cancel the auto zoom mode each time the auto zoom set/cancel key 33 is pressed. If step P7 has revealed that the key 33 is OFF, or after the operation of steps P9 and P10, the control sequence proceeds to step P11.

It is tested whether or not the format selection switch 35 is ON (step P11). If the switch is found ON, it is tested whether or not a format flag FF is 1 (step P12). If format flag FF is 1, it is reset to 0 and the format display of horizontal mode is turned on. If format flag FF is 0, it is set to 1 and the format display of vertical mode is turned on (steps P13 and P14). The above operation is to switch the display LED 36a or 36b to vertical mode or horizontal mode each time the format selection switch is turned on. If step P11 has revealed the format selection switch 36 to be OFF, or after the processing of steps P13 and P14, the control sequence proceeds to step P15, in which it is tested whether or not the auto zoom flag ZF is 1. If zoom flag ZF is 1, the magnification X of the projection lens in reader mode is identified as follows. The amount of zooming of the projection lens from the reference magnification position is memorized in terms of the number of pulses in the counter, and based on this value the magnification calculation table for the relevant lens stored in the ROM 81 is referenced to determine the magnification (step P16). Tables 1 and 2 show, as an example, the relationship between the number of pulses and the magnifications provided by the magnification calculation table.

TABLE 1

| Magnification: ×9 to ×16 | | |
| --- | --- | --- |
|  | magnification | number of pulses |
| reference magnification | ×9 | 0 |
|  | ×9.5 | 40 |
|  | ×10 | 80 |
|  | ×10.5 | 120 |
|  | ×11 | 160 |
|  | ×11.5 | 200 |
|  | ×12 | 240 |
|  | ×12.5 | 280 |
|  | ×13 | 320 |
|  | ×13.5 | 360 |
|  | ×14 | 400 |
|  | ×14.5 | 440 |
|  | ×15 | 480 |
|  | ×15.5 | 520 |
|  | ×16 | 560 |

TABLE 2

| Magnification: ×13 to ×27 | | |
| --- | --- | --- |
|  | magnification | number of pulses |
| reference magnification | ×13 | 0 |
|  | ×14 | 40 |
|  | ×15 | 80 |
|  | ×16 | 120 |
|  | ×17 | 160 |
|  | ×18 | 200 |
|  | ×19 | 240 |
|  | ×20 | 280 |
|  | ×21 | 320 |
|  | ×22 | 360 |
|  | ×23 | 400 |

TABLE 2-continued

Magnification: ×13 to ×27

| magnification | number of pulses |
|---|---|
| ×24 | 440 |
| ×25 | 480 |
| ×26 | 520 |
| ×27 | 560 |

Subsequently, the size of copy paper is read out of the sensor (step P17), and the longitudinal dimension of the copy paper is divided by the longitudinal distance of frame marks on the screen thereby to evaluate the correction factor Y (step P18). The magnification X of projection for reader mode is multiplied with the correction factor Y for the printer mode thereby to evaluate the magnification Z of projection for printing the image, which is projected by being defined by the marks on the screen, on the copy paper (i.e., magnification for copy) (step P19). It is tested whether or not the calculated magnification Z of projection is within the range of zooming of the projection lens (step P20). If the magnification Z is outside the zooming range, the inhibition of auto zoom is indicated (step P22), and the control sequence proceeds to step P3. If step 20 has revealed the magnification Z to be within the zooming range, the indicator of auto zoom inhibition is turned off (step P23). If the auto zoom flag ZF is found 0 in the test step P16, in which the auto zoom function is disactivated, the magnification Z is left unchanged (step P21), and the control sequence proceeds to step P23.

When the print key 37 is turned on, with the auto zoom negation indicator being turned off (step P24), the magnification of the projection lens is set to the magnification Z for printing (step P25). It is tested whether or not the print format is vertical mode (step P26). In the case of vertical mode, the projection light path is switched to the printing light path, and print operation is carried out, and thereafter the projection light path is restored to the reader light path (steps P27, P28 and P29). In the case of horizontal mode, the image rotation prism is rotated so that the projected image is turned by 90°, the projection light path is switched to the printing light path, print operation is carried out, and the projection light path is restored to the reader light path (steps P30, P31, P32, P33 and P34). Subsequently, the auto zoom flag ZF is tested (step P35). If ZF is 1, the magnification of the projection lens is restored to X for reader mode (step P36), and the control sequence returns to step P3. If ZF is 0, in which because the magnification of the projection lens is not altered, the control sequence returns to step P3, immediately.

Figure 8B:
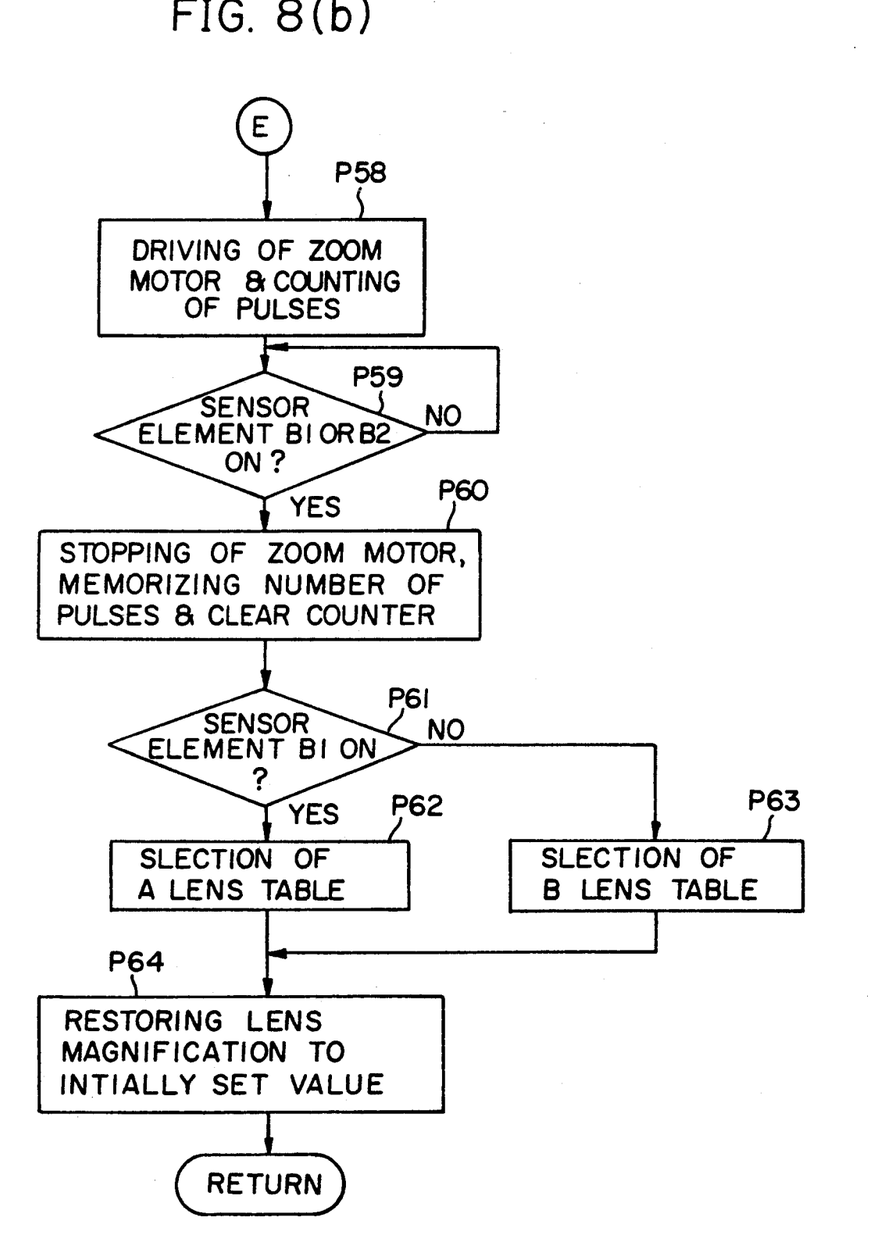

Next, the details of the initializing operation for the projection lens shown by steps P2 and P4 in the flowchart of FIG. 7 will be explained on the flowchart of FIG. 8(a) and 8(b). This embodiment is the case of initialization for two kinds of projection lenses A and B.

Initially, it is tested whether the projection lens is mounted (step P51). In this embodiment, this operation is based on whether or not the light receiving elements $B_1$ and $B_2$ receive the light from the light emitting elements $A_1$ and $A_2$. If both the light receiving elements $B_1$ and $B_2$ receive the light from the respective light emitting elements, i.e., if both the light receiving elements $B_1$ and $B_2$ are in the ON state, it is judged that no projection lens is mounted, or if at least one of the light receiving elements $B_1$ and $B_2$ is found to be in the OFF state, it is judged that the projection lens is mounted.

In response to the judgement of the absence of projection lens, it is indicated on the operation panel (step P52) so that the attachment of the projection lens is prompted. In response to the judgement of the attachment of the projection lens, the indicator of the absence of projection lens is turned off, the counter is cleared (step P53), and it is tested based on the state of the light receiving element $B_1$ or $B_2$ as to whether or not the magnification is set to the reference value (step P54). In response to the ON state, the state of the light receiving element $B_1$ is tested to find whether the lens A among the two lenses is ON (step P55), and in this case the magnification calculation table (Table 1) for the lens A stored in the ROM 81 is selected, or in another case the magnification calculation table (Table 2) for the lens B stored in the ROM 81 is selected (steps P56 and P57), and the control sequence returns to the main routine.

If step P54 has revealed that both the light receiving elements $B_1$ and $B_2$ of the sensor 50 are OFF, indicating that the reference magnification is not set, the zoom motor is driven so that the lens is operated toward the reference position, with drive pulses being counted, and the arrival of the reference magnification position is tested by means of the light receiving element $B_1$ or $B_2$ (step P59). At the arrival of the reference magnification position of the lens, the zoom motor is disactivated, the count value of drive pulses is stored in the memory, and the counter is cleared (step P60). Subsequently, discrimination of lens A or B is implemented based on the state of the light receiving element $B_1$ (step P61), and the relevant magnification calculation table for lens A or B is selected (steps P62 and P63). The zoom motor is driven reversely for the number of pulses which has been stored in the memory in step P60, so that the magnification of the projection lens at the time when it was mounted is restored (step P64), and the control sequence returns to the main routine.

In this manner, it is possible to recognize the magnification of the mounted lens even if the reference magnification has not been set.

Although this embodiment is the microfilm reader-printer, the present invention is not confined to it, but the invention is applicable to a reader having no printer section, a printer having no reader section, or other apparatus such as a reader-scanner.

Although in this embodiment the magnification is not displayed, it may be read out of the table in response to the count value and displayed in step P64 for example.

According to the embodiment, as described above, even if the projection lens is dismounted, the magnification which has been set in the previous operation is restored automatically when it is mounted again through the initializing operation of the magnification.

As a consequence during a copy operation of the microfilm reader-printer at a different magnification, the operator is freed from setting a magnification of the projection lens each time it is changed, whereby the job efficiency can be enhanced. Even if power of the apparatus is turned off due to the occurrence of a paper jam for example, the previous magnification is restored automatically through the initializing operation as in the case of mounting a lens, and the magnification setting operation can be eliminated.

What is claimed is:

1. An image projection apparatus comprising:
    means for supporting a zoom lens detachably;

means for driving said zoom lens for zooming;

first control means for controlling said drive means in response to the attachment of said zoom lens so that a magnification of the zoom lens is set to a reference value;

means for memorizing a zooming value implemented by said first control means that represents a displacement of said zoom lens from an initial magnification value to said reference value; and second control means for controlling said drive means in the opposite direction by the zooming value memorized in said memory means after said first control means has been operated.

2. An image projection apparatus according to claim 1, further comprising means for detecting that the magnification of the zoom lens has been set to the reference value.

3. An image projection apparatus according to claim 2, wherein said zoom lens is equipped with a zoom ring which is rotated by said drive means.

4. An image projection apparatus according to claim 3, wherein said detection means detects that a rotational position of said zoom ring is at a predetermined position.

5. An image projection apparatus according to claim 1, wherein said drive means comprises a pulse motor.

6. An image projection apparatus according to claim 5, wherein said memory means memorizes a number of pulses supplied to said pulse motor for setting the magnification of the zoom lens to the reference value.

7. An image projection apparatus comprising:
means for supporting a zoom lens detachably;
means for driving said zoom lens for zooming;
first control means for controlling said drive means in response to power-on of said apparatus so that a magnification of the zoom lens is set to a reference value;

means for memorizing a zooming value implemented by said first control means that represents a displacement of said zoom lens from an initial magnification value to said reference value; and second control means for controlling said drive means in the opposite direction by the zooming value memorized in said memory means after said first control means has been operated.

8. An image projection apparatus according to claim 7, further comprising means for detecting that the magnification of the zoom lens has been set to the reference value.

9. An image projection apparatus according to claim 8, wherein said zoom lens is equipped with a zoom ring which is rotated by said drive means.

10. An image projection apparatus according to claim 9, wherein said detection means detects that a rotational position of said zoom ring is at a predetermined position.

11. An image projection apparatus according to claim 7, wherein said drive means comprises a pulse motor.

12. An image projection apparatus according to claim 11, wherein said memory means memorizes a number of pulses supplied to said pulse motor for setting the magnification of the zoom lens to the reference value.

13. A method of driving a zoom lens which is detachably provided in an image projection apparatus comprising:

first step of detecting attachment of said zoom lens;

second step of setting a magnification of the zoom lens to a reference value in response to the attachment of said zoom lens;

third step of memorizing a zooming value which has been required for setting the magnification of said zoom lens to the reference value in said second step, said zooming value represents a displacement of said zoom lens from an initial magnification value to said reference value;

fourth step of zooming said zoom lens in the opposite direction by the memorized zooming value automatically following said second step.

14. A method of driving a zoom lens which is used in an image projection apparatus comprising:

first step of setting a magnification of the zoom lens to a reference value in response to the power-on of said apparatus;

second step of memorizing a zooming value which has been required for setting the magnification of said zoom lens to the reference value in said first step, said zooming value represents a displacement of said zoom lens for an initial magnification value to said reference value; and third step of zooming said zoom lens in the opposite direction by the memorized zooming value automatically following said first step.

15. An image projection apparatus comprising:
means for removably mounting a zoom lens unit;
drive means for driving a mounted zoom lens unit;
means for sensing the mounting of a zoom lens unit;
first control means for controlling the drive means in response to a power-on of the apparatus so that a magnification is set to a predetermined reference value;

means for determining a zooming value of the mounted zoom lens unit, which represents the displacement of the zoom lens unit from an initial magnification value to a reference value;

means for memorizing the zooming value of the zoom lens unit, and second control means for controlling the drive means in response to the memorized zooming value to drive the zoom lens unit to the memorized zooming value.

16. An image projection apparatus according to claim 15 wherein the drive means includes a pulse motor.

17. An image projection apparatus according to claim 15 wherein the determining means includes a counter to count pulses applied to the pulse motor.

* * * * *